United States Patent
Feyereisen et al.

(10) Patent No.: US 8,903,655 B2
(45) Date of Patent: Dec. 2, 2014

(54) METHOD AND SYSTEM FOR DISPLAYING EMPHASIZED AIRCRAFT TAXI LANDMARKS

(75) Inventors: Thea L. Feyereisen, Hudson, WI (US); Troy Nichols, Peoria, AZ (US); Gang He, Morristown, NJ (US); Dave Pepitone, Sun City West, AZ (US); John G. Suddreth, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 886 days.

(21) Appl. No.: 12/627,760

(22) Filed: Nov. 30, 2009

(65) Prior Publication Data

US 2011/0130963 A1 Jun. 2, 2011

(51) Int. Cl.
*G01C 21/00* (2006.01)
*G09G 5/02* (2006.01)
*G01C 23/00* (2006.01)
*G08G 5/06* (2006.01)
*G08G 5/00* (2006.01)

(52) U.S. Cl.
CPC .............. *G01C 23/00* (2013.01); *G08G 5/065* (2013.01); *G08G 5/0021* (2013.01)
USPC ............................................. 701/516; 701/3

(58) Field of Classification Search
USPC ........ 701/14, 207, 208, 212, 3; 340/947, 948, 340/950, 951, 958, 972, 982
See application file for complete search history.

(56) References Cited

U.S. PATENT DOCUMENTS

| | | | |
|---|---|---|---|
| 6,571,166 B1 * | 5/2003 | Johnson et al. | 701/120 |
| 6,731,226 B2 * | 5/2004 | Walter | 340/972 |
| 7,382,288 B1 * | 6/2008 | Wilson et al. | 340/972 |
| 7,564,372 B1 * | 7/2009 | Bailey et al. | 340/961 |
| 7,589,644 B2 * | 9/2009 | Meunier | 340/945 |
| 2003/0102987 A1 * | 6/2003 | Walter | 340/972 |
| 2003/0105581 A1 * | 6/2003 | Walter | 701/120 |
| 2007/0241936 A1 * | 10/2007 | Arthur et al. | 340/958 |
| 2008/0275642 A1 * | 11/2008 | Clark et al. | 701/208 |
| 2009/0045982 A1 * | 2/2009 | Caillaud et al. | 340/972 |
| 2010/0198489 A1 * | 8/2010 | Rozovski et al. | 701/120 |

OTHER PUBLICATIONS

Foyle et al.; Taxiway Navigation and Situation Awareness (T-NASA) System: Problem, Design Philosophy, and Description of an Integrated Display Suite for Low-Visibility Airport Surface Operations, SAE Transactions: Journal of Aerospace, 105, pp. 1411-1418.

* cited by examiner

*Primary Examiner* — Jason Holloway
(74) *Attorney, Agent, or Firm* — Ingrassia Fisher & Lorenz, P.C.

(57) ABSTRACT

An aircrew situational awareness while taxiing is enhanced by blossoming a displayed landmark related to the current taxiway from a first format to a second format as the aircraft approaches the landmark.

17 Claims, 6 Drawing Sheets

FIG. 2

METHOD AND SYSTEM FOR DISPLAYING EMPHASIZED AIRCRAFT TAXI LANDMARKS

TECHNICAL FIELD

The present invention generally relates to ground operation of aircraft and more particularly to a method and system for surface movement situation awareness for aircraft on runways and taxiways.

BACKGROUND OF THE INVENTION

It is important for pilots to know the layout of the taxiways and runways when taxiing for takeoff or from landing. Navigation of an airport surface (taxiways/runways) can be as difficult (from a pilot's workload perspective) and dangerous (from an aviation safety perspective) as the airborne portion of the flight, especially in limited visibility of night and/or weather, or at unfamiliar airports. An increase in pilot workload typically results in decreased safety: the pilot must interpret the information provided on the screen occupying her thought processes when she may have many other decisions to make. Undesired results include taxiing onto unapproved taxiways/runways and becoming disorientated while taxiing.

Traditionally, pilots have relied upon paper charts to gain knowledge of the airport layout and understand their position within, and how to navigate, the airport taxiway/runway matrix. More recently, this information has been made available to the pilot by electronic flight bags and electronic chart readers. However, these known electronic displays are typically monochromatic and without any prominence provided for runways and critical markers, making it difficult for the pilot to properly discern between taxiways, runways, and obstacles such as construction and slopes in the taxiway.

Accordingly, it is desirable to provide a method and system displaying emphasized markers/landmarks in a airport taxi environment that may be more easily understood by the pilot. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

A method is described for enhancing ground situational awareness to an aircrew via a display within an aircraft operating at an airport, including displaying at least one taxiway for the airport, displaying at least one runway for the airport, displaying a landmark related to the at least one taxiway, determining the position of the aircraft, displaying the aircraft, and blossoming the landmark as the aircraft approaches the landmark.

A ground situational awareness system for an aircraft is described, including a display, a system for determining the position of the aircraft in relation to a plurality of taxiways and a landmark, and a processor, wherein the processor is configured to display the plurality of taxiways, display the aircraft, display the landmark, and blossom the landmark as the aircraft approaches the landmark.

BRIEF DESCRIPTION OF THE DRAWINGS

The present invention will hereinafter be described in conjunction with the following drawing figures, wherein like numerals denote like elements.

FIG. 2 is a first image displayed in accordance with a first exemplary embodiment that may be rendered on the flight display system of FIG. 1;

DETAILED DESCRIPTION OF AN EXEMPLARY EMBODIMENT

The following detailed description of the invention is merely exemplary in nature and is not intended to limit the invention or the application and uses of the invention. Furthermore, there is no intention to be bound by any theory presented in the preceding technical field, background, brief summary, or the following detailed description.

A method is disclosed for presenting taxi markers, which may also be referred to as landmarks, in different or changing formats, for example, blinking and highlighting, to alert the pilot that he is near or approaching an important landmark. Information pertinent for a safe taxiing procedure is displayed to the pilot. Pertinent information, for example, may relate to a taxi turn point, a hold line for entering a runway (number one for take off, or for crossing an active runway), an obstacle (airport construction), and designated non-taxi areas.

A display system presents images on a screen, viewable by an aircrew member, of taxiways, runways, and obstacles presented to taxiing. The format of these taxiways, runways, and obstacles may change based on importance to the pilot before or during taxi. The format may blossom as the aircraft approaches a specific taxiway, runway, or obstacle. The word "blossom" as used herein means to change format. The format may include, for example, difference in size, color, or brightness, and may temporally vary in brightness, for example, blinking, flashing, or fading. In one embodiment, the images presented within the aircraft may be responsive to information received from ground control. For example, clearance to cross a hold line is transmitted from ground control from data link 120 to the aircraft's data link unit 115. This clearance is processed by the processor 104, and along with the aircrafts approach to the hold line, prompts the blossoming of the hold line. In yet another embodiment, the images presented within the aircraft may be responsive to information received from another aircraft. For example, a landmark may blossom more prominently as the aircraft approaches a runway and a transponder signal is received from an aircraft indicating that it is moving on the runway.

While the exemplary embodiments described herein refer to displaying the information on ground based aircraft, the invention may also be applied to other exemplary embodiments such as displays in sea going vessels and displays used by traffic controllers.

Figure 1:
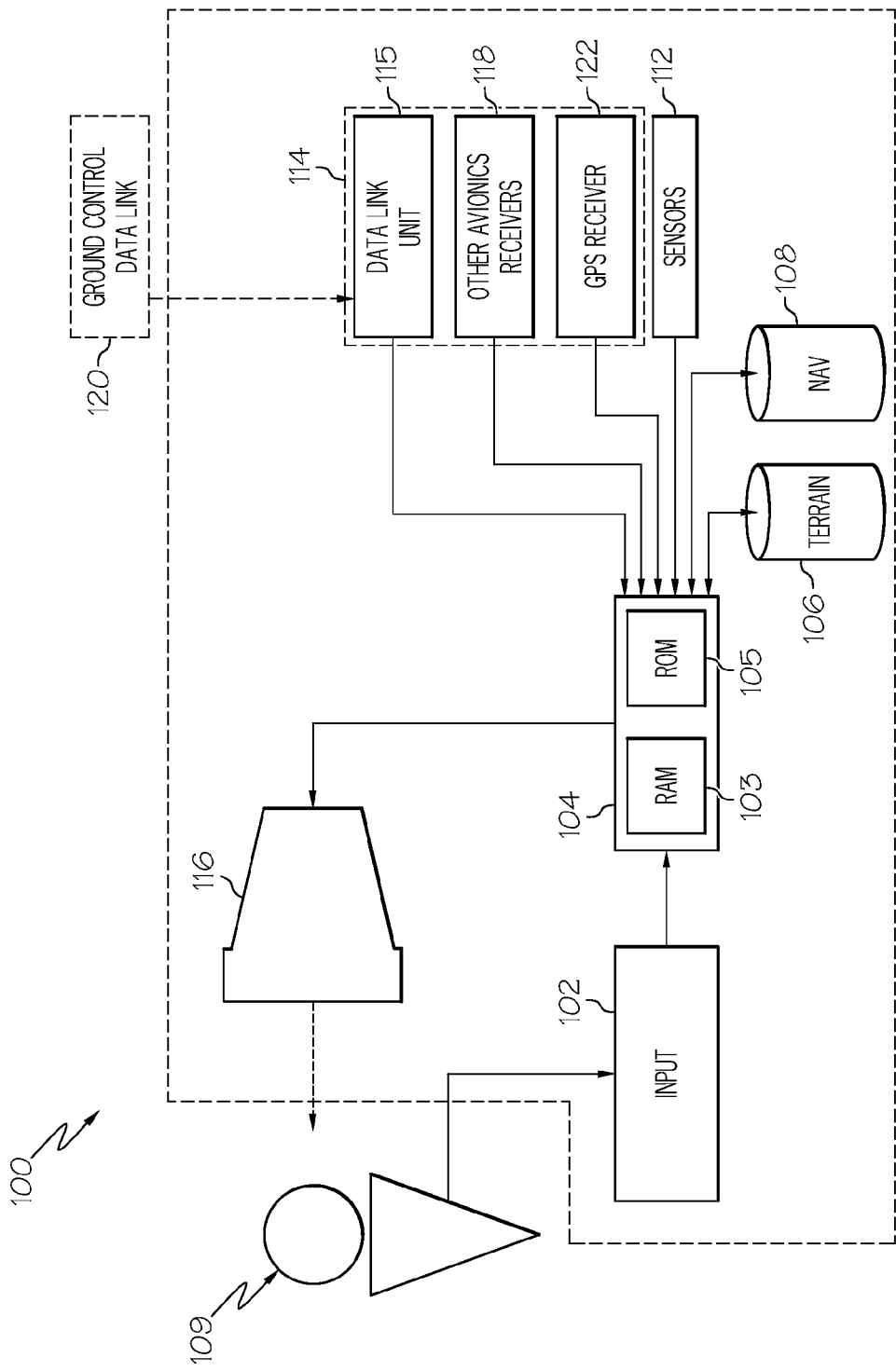
FIG. 1 is a functional block diagram of a flight display system.

Referring to FIG. 1, an exemplary flight deck display system 100 is depicted and will be described for displaying winds aloft at various altitudes. The system 100 includes a user interface 102, a processor 104, one or more terrain/taxiway databases 106, one or more navigation databases 108, various optional sensors 112 (for the cockpit display version), various external data sources 114, and a display device 116. In some embodiments the user interface 102 and the display device 116 may be combined in the same device, for example, a touch pad. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs.

The processor 104 may be any one of numerous known general-purpose microprocessors or an application specific processor that operates in response to program instructions. In the depicted embodiment, the processor 104 includes onboard RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain/taxiway databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain/taxiway databases 106 and navigation data from one or more of the navigation databases 108, and to supply appropriate display commands to the display device 116. The display device 116, in response to the display commands from, for example, a touch screen, keypad, cursor control, line select, concentric knobs, voice control, and datalink message, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain/taxiway databases 106 include various types of data representative of the surface over which the aircraft is taxiing, the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain/taxiway databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain/taxiway databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only a datalink unit 115 and a global position system (GPS) receiver 122 are depicted in FIG. 1, and will now be briefly described.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Figure 2:
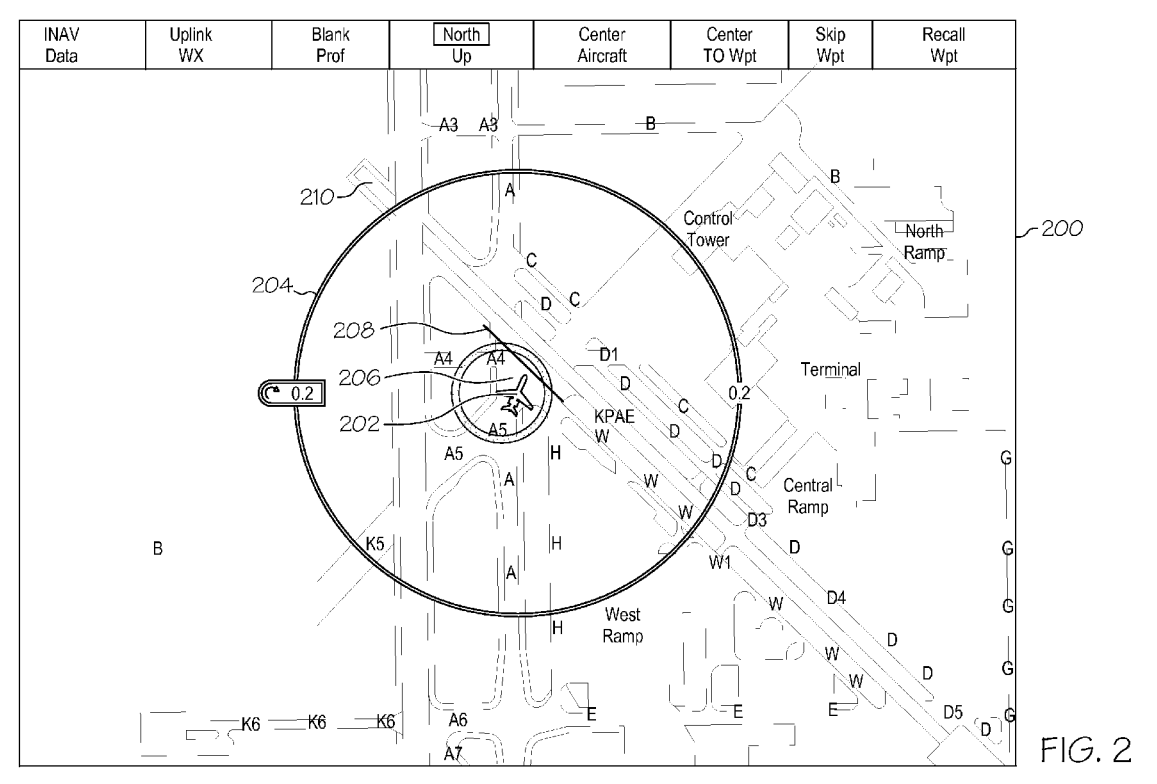

With reference to FIG. 2, the display 116 includes a display area 200 in which multiple graphical images may be simultaneously displayed. Data for the location and boundaries of the taxiways A, B, C, D, E, G, K (and various numbered branches thereof), and runway 210 (runway 11-29) are stored in the terrain/taxiway database 106 and are processed by the processor 104 for display. Positional data (location, direction, speed) is determined, by data received by the GPS system 122 and processed for the base aircraft 202 which contains the flight deck display system 100. Images of the taxiways A, B, C, D, E, G, K, runway 210, and aircraft 202 are displayed on the display area 200 in a location determined by the positional data. The display area 200 may also include obstacles (not shown), such as airport construction, lighting, and non-taxi areas. The circle 204 indicates a distance from the aircraft 202, and in this example, is 0.2 tenths of a mile.

Marked on the surface of the intersection 206 between taxiways A4 and A5 is a hold line 208. Airplanes are not permitted to cross the hold line 208 onto runway 11-29 until given clearance by ground control. Typically the edge, or boundary, 210 of the runway 11-29 is marked. These markings are typically painted on the taxiway and runway surface.

Figure 3:
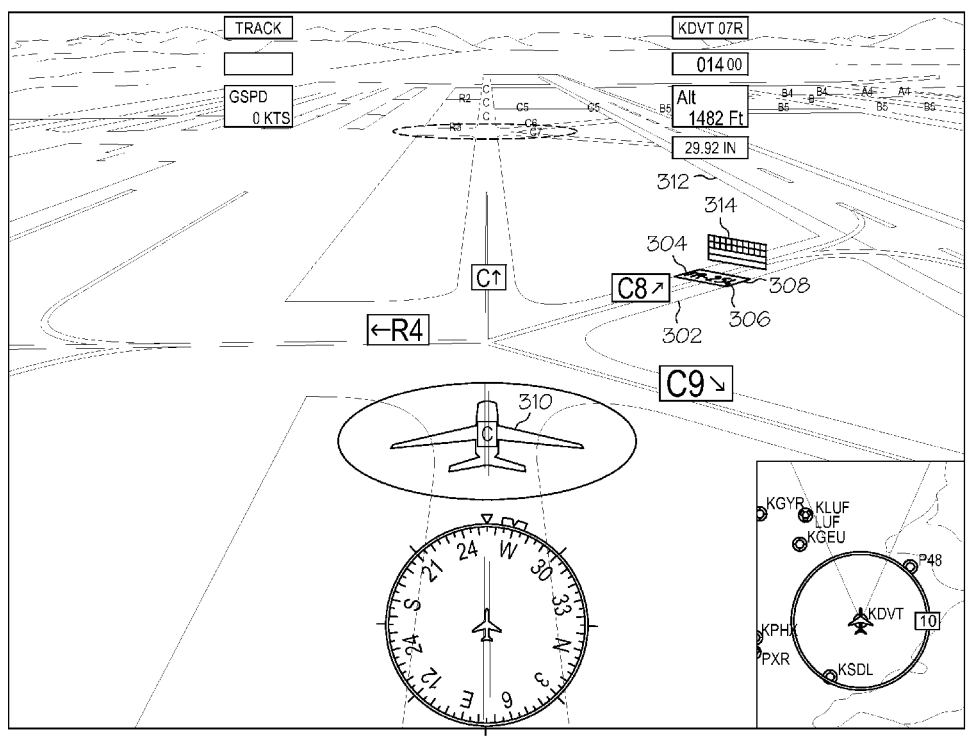
FIG. 3 is a second image displayed in accordance with a second exemplary embodiment that may be rendered on the flight display system of FIG. 1.

In accordance with a first exemplary embodiment, as the aircraft 202 approaches the hold line 208, the hold line 208 blossoms to alert the aircrew of its location (FIG. 3). Optionally, the runway boundary 210 may also blossom. The word "blossom" means to change format. This format change, for example, means that the hold line 208 may increase in brightness or size, blink, change color, or be displayed in three dimensions. Additionally, as the aircraft 202 taxies out to the runway 210, it may encounter obstacles, for example, construction and structures. The obstacles, or an area of the taxiway or an area adjacent to the taxiway in which an obstacle exists, may also blossom as the aircraft approaches.

Figure 4:
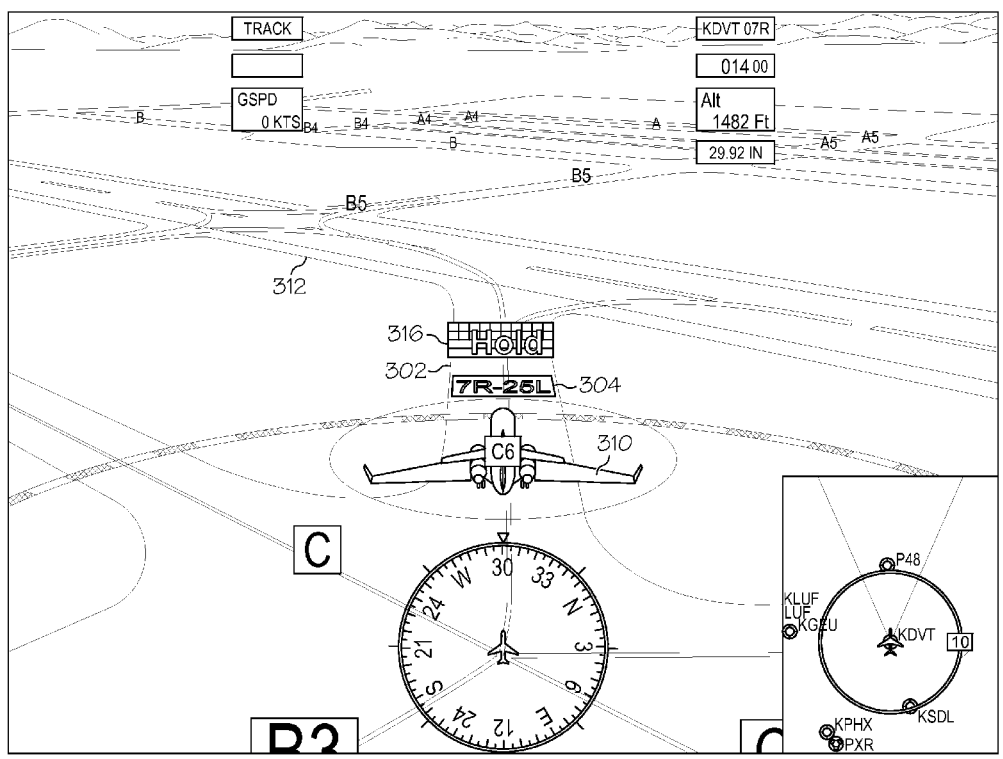
FIG. 4 is a third image displayed in accordance with a third exemplary embodiment that may be rendered on the flight display system of FIG. 1.

A hold line may also be more than just a line on the taxiway. Referring to FIG. 3, the hold "line" is shown on the taxiway 302 as a diagram 304 on the screen 300, including for example, lines 306 and squares 308. In accordance with a second exemplary embodiment, as the aircraft 310 approaches the runway 312 on taxiway 302, a banner 314 representative of the diagram 304 appears in a three dimensional view above the taxiway 302. Optionally, in a third exemplary embodiment as shown in FIG. 4, a textual message 316, for example, the word HOLD may appear on the banner 314.

In each of the above described exemplary embodiments, the pilot may adjust a threshold that determines when the blossoming occurs. For example, the pilot may adjust the distance of the aircraft to the landmark that initiates the blossoming In fog, the pilot may desire to have the blossoming occur at 800 feet instead of, say for example, 400 feet. Alternatively, the pilot may desire to adjust the threshold for a particular type of hazard, for example, a turn point.

Figure 5:
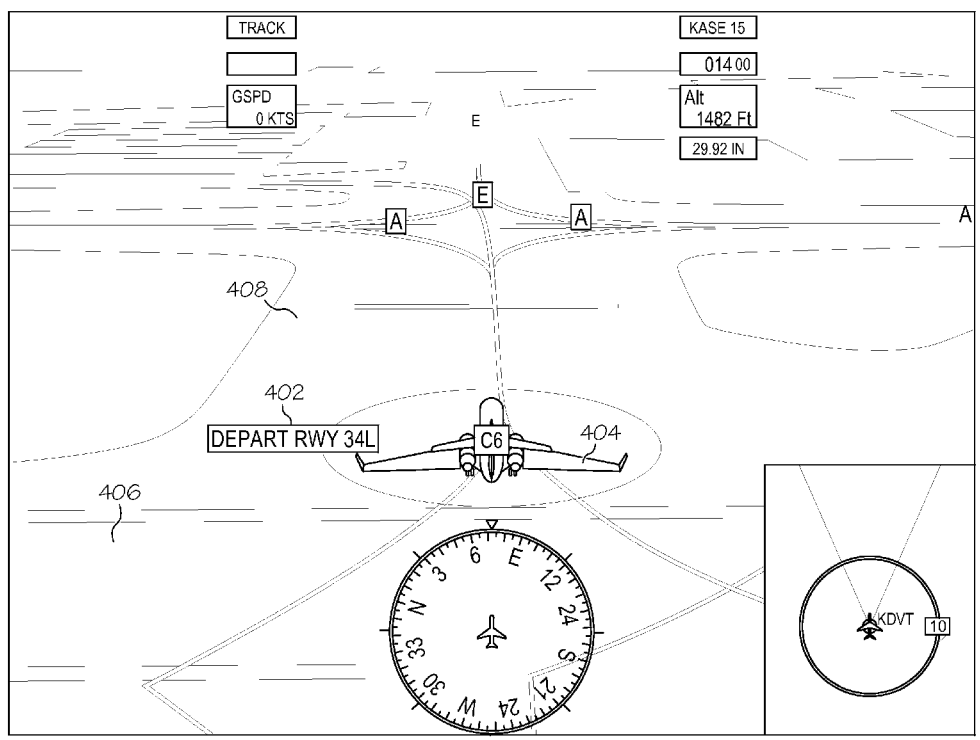
FIG. 5 is a fourth image displayed in accordance with a fourth exemplary embodiment that may be rendered on the flight display system of FIG. 1.

Referring to FIG. 5, a banner 402 is provided in a fourth exemplary embodiment as the aircraft 404 is departing the runway 406 onto taxiway 408. The banner 402 may contain symbols (not shown), or a textual message such as DEPART RUNWAY 34L. This would inform the pilot that the taxi marked with the textual message is the ground control desired taxiway in which to depart the runway.

Figure 6:
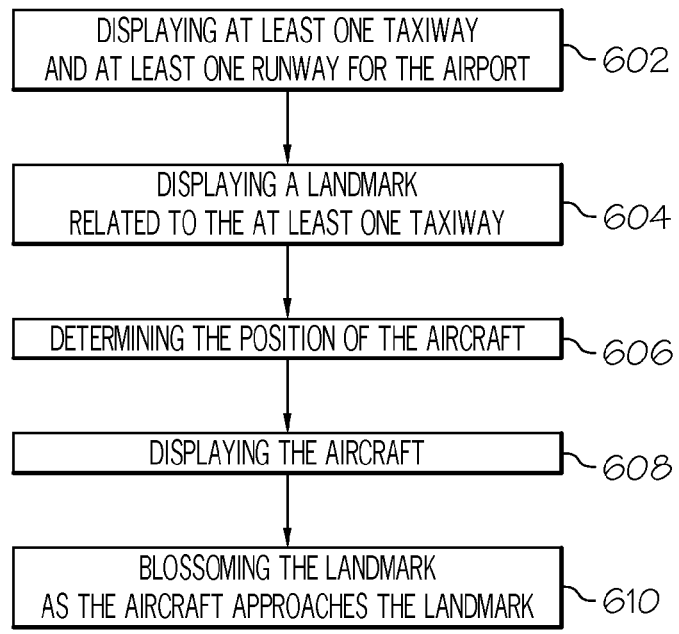
FIG. 6 is a flow chart of the steps of the first through fourth exemplary embodiments.

FIG. 6 is a flow chart of the steps in the first, second, third, and fourth exemplary embodiments, the exemplary method for enhancing ground situational awareness of an aircrew via a display within an aircraft operating at an airport, including displaying 602 at least one taxiway for the airport and optionally at least one runway, displaying 604 a landmark related to the at least one taxiway, determining 606 the position of the aircraft, displaying 608 the aircraft, and blossoming 610 the landmark as the aircraft approaches the landmark.

Figure 7:
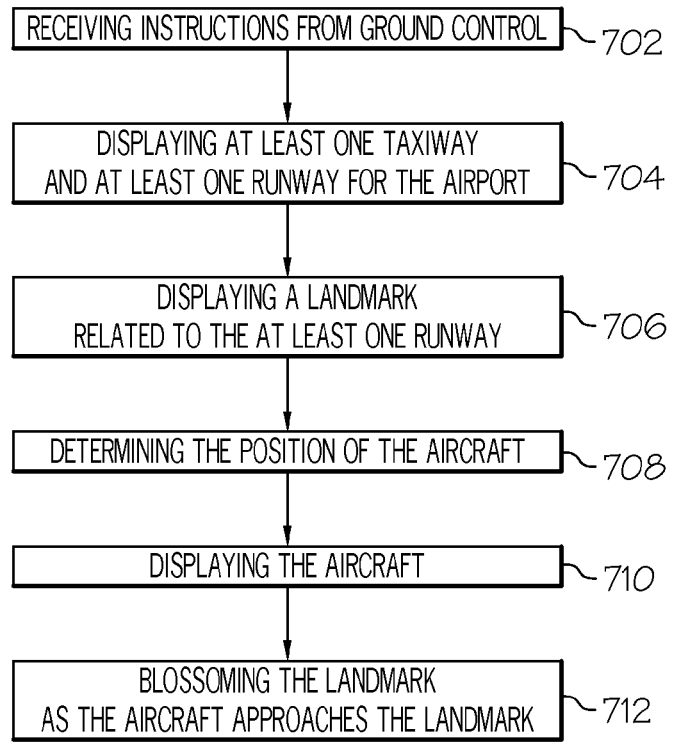
FIG. 7 is a flow chart of the steps of a fifth exemplary embodiment.

FIG. 7 is a flow chart of the steps in a fifth exemplary embodiment in which instructions are received 702 from ground control, at least one taxiway and runway are displayed 704, a landmark related to the runway is displayed 706, the position of the aircraft is determined 708, the aircraft is displayed 710, and the landmark is blossomed 712 in response to the instructions from ground control and the aircraft approaching the landmark.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for enhancing by a processor the ground situational awareness of an aircrew via a display within an aircraft operating at an airport having a runway, comprising:
    displaying via the display at least one taxiway and at least one runway for the airport;
    displaying via the display a first landmark related to the at least one taxiway in a first format;
    displaying via the display a second landmark related to the runway in the first format;
    determining via the processor the position of the aircraft;
    displaying via the display the aircraft;
    blossoming via the processor the first landmark for display in a second format on the display as the aircraft approaches the first landmark; and
    blossoming via the processor the second landmark for display in the second format on the display as the aircraft approaches the second landmark,
    wherein the blossoming occurs at a threshold associated with each of the first and second landmarks, the threshold being adjustable by a crewmember of the aircraft via a user interface.

2. The method of claim 1 wherein the blossoming step comprises changing the color of the first landmark.

3. The method of claim 1 wherein the blossoming step comprises increasing the intensity of the first landmark.

4. The method of claim 1 wherein the blossoming step comprises changing the dimensions of the first landmark.

5. The method of claim 1 wherein the blossoming step comprises displaying the first landmark in three dimensions.

6. The method of claim 5 wherein the blossoming step comprises displaying text on the first landmark.

7. The method of claim 1 wherein the displaying a first landmark step comprises displaying a symbol representing a hold line on the at least one taxiway.

8. The method of claim 1 wherein the displaying a first landmark step comprises displaying a symbol representing an obstacle influencing taxing on the at least one taxiway.

9. The method of claim 1 further comprising receiving information from ground control wherein the blossoming step occurs in response thereto.

10. The method of claim 1 further comprising receiving information from another aircraft wherein the blossoming step occurs in response thereto.

11. The method of claim 1 further comprising adjusting a threshold at which the blossoming occurs.

12. The method of claim 1 wherein the blossoming step comprises alternating the brightness of the first landmark.

13. A method for enhancing by a processor the ground situational awareness to an aircrew via a display within an aircraft operating at an airport, comprising:
   displaying via the display at least one taxiway for the airport;
   displaying via the display at least one runway for the airport;
   displaying via the display a first landmark related to the at least one taxiway in a first format;
   displaying via the display a second landmark related to the at least one runway in the first format;
   determining via the processor the position of the aircraft;
   displaying via the display the aircraft; and
   blossoming via the processor on the display the first landmark for display in a second format as the aircraft approaches the first landmark; and
   blossoming via the processor on the display the second landmark for display in a second format as the aircraft approaches the second landmark,
   wherein the blossoming occurs at a threshold associated with each of the first and second landmarks, the threshold being adjustable by a crewmember of the aircraft via a user interface.

14. The method of claim 13 wherein the blossoming step comprises changing the format of the first landmark.

15. The method of claim 13 wherein the blossoming step comprises displaying text on the displayed first landmark.

16. The method of claim 13 wherein the displaying a first landmark comprises displaying a symbol representing a hold line on the at least one taxiway.

17. A ground situational awareness system for an aircraft, comprising:
   a display;
   a system for determining the position of the aircraft in relation to a plurality of taxiways and a first landmark associated therewith, and a runway and a second landmark associated therewith; and
   a processor configured to:
      display the plurality of taxiways;
      display the runway;
      display the aircraft;
      display the first and second landmarks in a first format; and
      blossom the first landmark for display in a second format as the aircraft approaches the first landmark; and
      blossom the second landmark for display in a second format as the aircraft approaches the second landmark,
      wherein the blossoming occurs at a threshold associated with each of the first and second landmarks, the threshold being adjustable by a crewmember of the aircraft via a user interface.

* * * * *